United States Patent [19]

Sawada

[11] Patent Number: 4,580,238
[45] Date of Patent: Apr. 1, 1986

[54] ARITHMETIC OPERATING SYSTEM

[75] Inventor: Hideo Sawada, Hadano, Japan

[73] Assignee: Hitachi, Ltd., Tokyo, Japan

[21] Appl. No.: 397,992

[22] Filed: Jul. 14, 1982

[30] Foreign Application Priority Data

Oct. 2, 1981 [JP] Japan .............................. 56-156267

[51] Int. Cl.[4] .......................... G06F 9/20; G06F 13/00
[52] U.S. Cl. ..................................... 364/736; 364/200
[58] Field of Search ................ 364/736, 200 MS File, 364/900 MS File

[56] References Cited

U.S. PATENT DOCUMENTS

| | | | |
|---|---|---|---|
| 3,048,332 | 8/1962 | Brooks, Jr. et al. ................. | 364/200 |
| 3,202,969 | 8/1965 | Dunwell et al. .................... | 364/200 |
| 3,377,579 | 4/1968 | Wissick et al. ...................... | 364/200 |
| 3,840,861 | 10/1974 | Amdahl et al. ..................... | 364/200 |
| 4,075,688 | 2/1978 | Lynch, Jr. et al. ................. | 364/200 |
| 4,080,648 | 3/1978 | Asano et al. ....................... | 364/200 |
| 4,167,779 | 9/1979 | Sullivan et al. .................... | 364/200 |
| 4,168,523 | 9/1979 | Chari et al. ........................ | 364/200 |
| 4,197,579 | 4/1980 | Otis et al. .......................... | 364/200 |
| 4,313,158 | 1/1982 | Porter et al. ....................... | 364/200 |
| 4,365,311 | 12/1982 | Fukunaga et al. .................. | 364/900 |

OTHER PUBLICATIONS

"MC5-48 TM Family of Single Chip Microcomputers User's Manual" Intel. Sep. 1980, pp. 8-1-8-4.

Primary Examiner—James D. Thomas
Assistant Examiner—Dale M. Shaw
Attorney, Agent, or Firm—Antonelli, Terry & Wands

[57] ABSTRACT

An arithmetic operating system for rapidly executing an instruction having an operand relating to an arithmetic operation stored in a main storage is disclosed. An operand necessary for a succeeding arithmetic operation is read from the main storage prior to the writing of an intermediate operation result to the main storage so that the succeeding arithmetic operation and the writing of the intermediate operation result can be overlapped in time.

8 Claims, 5 Drawing Figures

ARITHMETIC OPERATING SYSTEM

The present invention relates to an arithmetic operating system for rapidly executing an instruction having at least an operand relating to an arithmetic operation stored in a main storage.

In a prior art data processing unit, in order to execute an instruction for processing operands stored in a main storage (hereinafter called a storage-storage (SS) type instruction), a portion of a first operand and a portion of a second operand are fetched from the main storage on the basis of an access address, the data is processed in a data width which the data processing unit can access at one time, an operation result having that data width is written into a first operand area in the main storage, the access address is then updated to fetch a succeeding portion of the first operand, and the above operations are repeated until a specified length of data is processed.

Accordingly, the fetching of the succeeding portion of the operand is delayed until the writing of the result of operation on the preceding portion is completed, and the data processing is interrupted because of a lack of data to be processed. As a result, the execution of the SS type instruction takes a long time.

It is an object of the present invention to provide an arithmetic operating system having a reduced execution time for such an instruction.

In accordance with the present invention, an operand part necessary for a succeeding arithmetic operation is fetched prior to the writing of an intermediate operation result so that the writing of the intermediate operation result and the succeeding arithmetic operations are overlapped in time to reduce the execution time of the instruction.

The present invention will be apparent from the following detailed description taken in conjunction with the accompanying drawings, in which.

Figure 1:
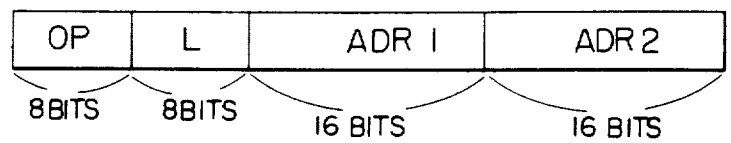
FIG. 1 shows a format of an SS type instruction.

FIG. 1 shows a typical example of the format of an SS type instruction. An OP field is of 8-bit length and contains an instruction code which specifies an operation to be carried out for the operands. An L field is of 8-bit length to designate the length of the operand to be processed and contains a binary number which is equal to the number of bytes in the operand less one. Accordingly, a 1 to 256-byte (one byte consisting of 8 bits) operand can be specified by the L field. An ADR1 field and an ADR2 field each are of 16-bit length and specify start addresses of a first operand and a second operand, respectively. Accordingly, the operands relating to the arithmetic operation are within ADR1 ~ ADR1 + L and ADR2 ~ ADR2 + L, respectively, and the operands are processed in the ascending order of the addresses. An operation result is written into a first operand area.

One embodiment of the present invention is now explained with reference to FIGS. 2 to 5.

Figure 2:
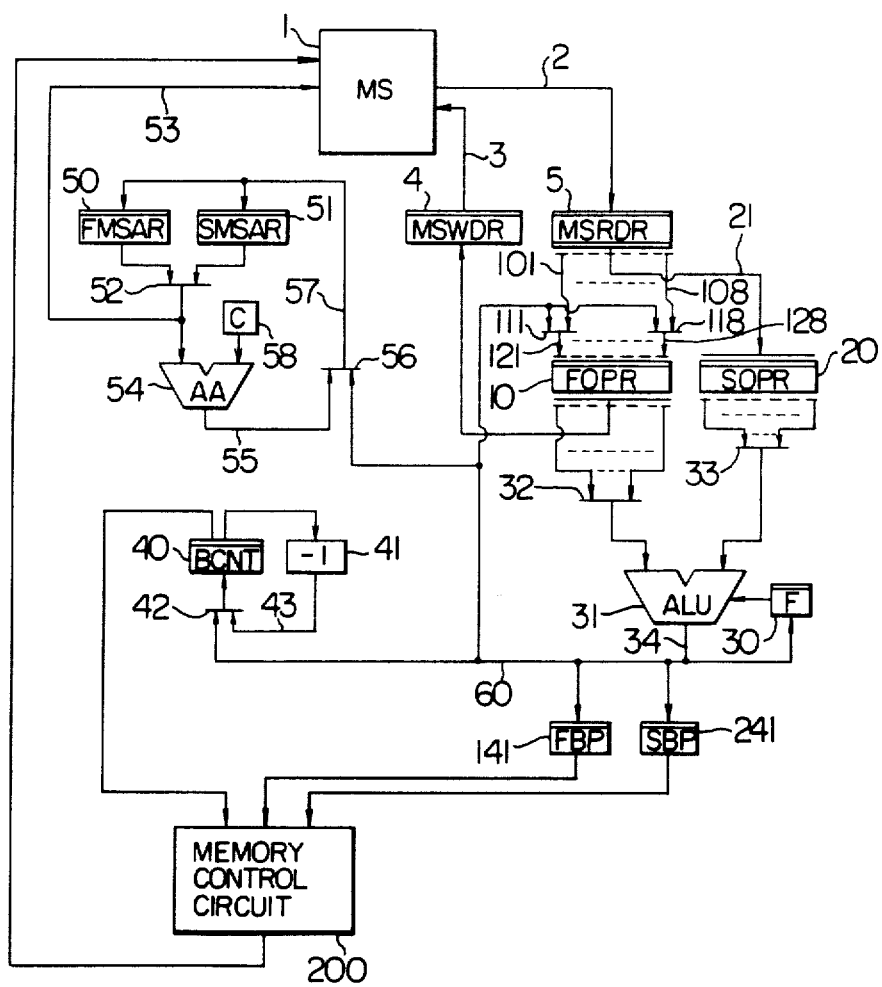
FIG. 2 shows a block diagram of a data processing unit in accordance with the present invention.

FIG. 2 shows a block diagram of a data processing unit in accordance with the present invention. Numeral 1 denotes a main storage (MS) in which operands of the SS type instruction and instructions are stored. The main storage 1 can be accessed eight bytes at a time through an MS address bus 53 and the read data is loaded into an 8-byte depth read data register (MSRDR) 5 through an 8-byte width read bus 2. An 8-byte write data is supplied from a write data register (MSWDR) 4 to the main storage 1 through a write bus 3. Numeral 10 denotes an 8-byte width first operand register (FOPR). In setting the operand, the bytes in the MSRDR 5 are transferred to the FOPR 10 through MSRDR output lines 101-108, FOPR input selectors 111-118 provided one for each of the bytes of the FOPR 10 and data lines 121-128. Numeral 20 denotes an 8-byte width second operand register (SOPR). The bytes in the MSRDR 5 are transferred to the SOPR 20 eight bytes at a time through an 8-byte width MSRDR data bus 21.

The operands loaded into the FOPR 10 and the SOPR 20 are supplied to an arithmetic logic unit (ALU) 31 having one-byte width inputs through selectors 32 and 33 each of which selects one byte from the corresponding 8-byte width register.

The ALU 31 carries out an arithmetic logic operation on the input data in with an operation stored in an instruction code register (F) 30 and produces an output on a one-byte width ALU output line 34.

The output of the ALU 31 is sent to the byte positions of the FOPR 10 in which the ALU input was stored, through the FOPR input selectors 111-118, which issue set signals to only those byte positions.

The operand thus loaded into the FOPR 10 is supplied to the ALU 31 one byte at a time and the ALU outputs are written into the byte positions one byte at a time. When the writing of the result is completed, a first-operand byte pointer (FBP) 141 and a second-operand byte pointer (SBP) 241 which specify the byte positions of the FOPR 10 and the SOPR 20, respectively, are incremented by one. The operations of the FBP 141 and the SBP 241 are explained later.

At the end of each one-byte processing, an unprocessed byte counter (BCNT) 40 is connected to a subtractor output line 43 of a subtractor 41 through a BCNT input selector 42 so that the content of the BCNT 40 is decremented by one.

In reading or writing the first operand, the address to access the first eight bytes of the operand from the MS 1 is supplied from a first operand address register (FMSAR) 50 through an address selector 52 and the MS address bus 53. The MS address bus 53 is also connected to an input of an address adder/subtractor (AA) 54 which updates the MS access address. In reading the second operand, the content of second-operand address register (SMSAR) 51 is used as the MS access address.

The AA 54 receives the address from the FMSAR 50 or the SMSAR 51 at one input thereof and a constant (0, 8 or 16) from a constant generator (C) 58 at the other input. The AA 54 can carry out an add operation and a subtract operation and the type of operation and the constant value of the generator 58 are specified by a system controller for governing the operations of the system (not shown) under control of a microprogram.

The output of the AA 54 is returned to the input register to the AA 54, through an AA output line 55, an address register input selector 56 and an address register input line 57 so that the address register is updated.

Figure 3:
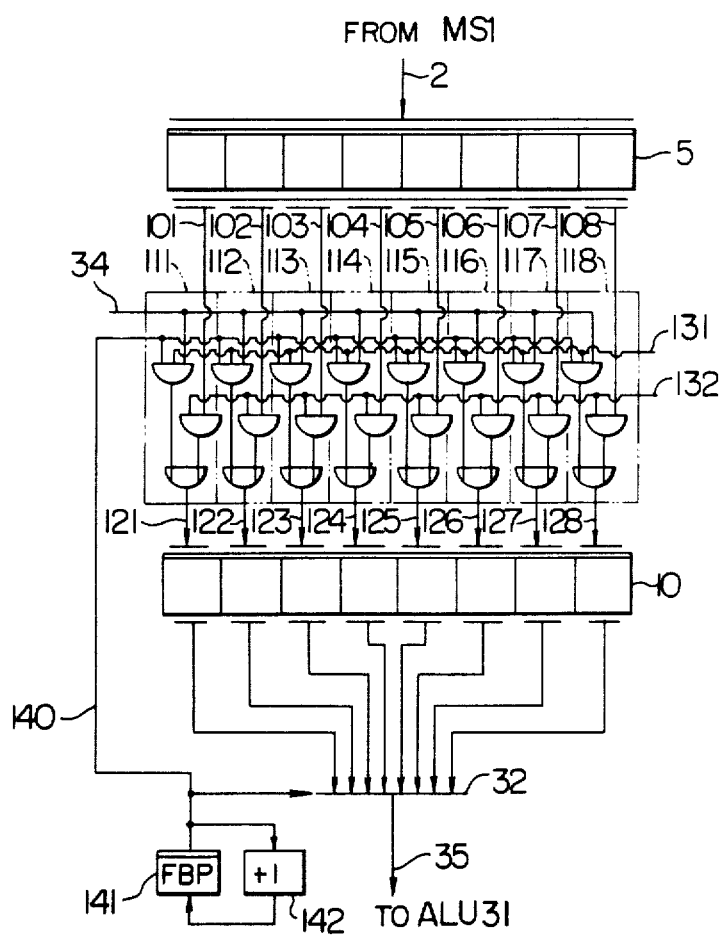
FIG. 3 shows details of peripheral circuits of the read data register and the first operand register shown in FIG. 2.

FIG. 3 shows a detail of peripheral circuits of the MSRDR 5 and the FOPR 2 shown in FIG. 10.

The FBP 141 controls the selector 32 which selects one byte to be supplied to the ALU 31. At the start of the execution of the instruction, the first operand address, that is, low order three bits of the FMSAR 50 are loaded into the FBP 141, which produces a decoded signal. When the content of the FBP 141 is "000" in binary notation, the first byte position or the leftmost byte position (at which data of the smallest address is stored) of the FOPR 10 is specified, when it is "010", the third byte position is specified, and when it is "111", the eighth byte position or the rightmost byte position is specified.

The output 140 of the FBP 141 is also supplied to the FOPR input selectors 111-118 to write the ALU output to the specified positions of the FOPR 10 (which are identical to the byte positions specified for the inputs to the ALU 31).

When the eight bytes from the MSRDR 5 are to be selected in parallel, the FOPR input selectors 111-118 issue an 8-byte set signal 132 and suppress a one-byte set signal 131 so that the bytes are transferred from the MSRDR 5 to the FOPR 10. On the other hand, when one byte from the ALU 31 is to be written, the byte is written into only one byte position of the FOPR 10 specified by the FBP 141 by AND gates which are conditioned by the output 140 of the FBP 141, the output 34 of the ALU 31 and the one-byte set signal 131.

At the end of each one-byte processing, the content of the FBP 141 is incremented by one by an adder 142. When the content of the FBP 141 reaches "111" in binary notation, it is then wrapped around to "000".

The SPB 241 for the second operand is provided for the SOPR 20 like the FOPR 10. The operations of the SOPR 20 and the SBP 241 are identical to those of the FOPR 10 and the FBP 141 except that the one-byte write operation from the ALU 31 is not carried out. Accordingly, the description of the operations is omitted here.

An MCC 200 represents a memory control circuit for controlling access operations to the MS 1 under control of a microprogram and is included in the system controller. To the MCC 200 outputs of FBP 141, SBP 241 and BCNT 40 are supplied. The MCC 200 detects the presence of a write request when the content of BCNT 40 is 0 or the content of FBP 141 is "000" and it detects the presence of a read request when the content of FBP 141 is "000" or the content of SBP 241 is "000".

The SS type instruction stored in the MS 1 appears on the data bus 60 one byte at a time through the read bus 2, the MSRDR 5, the data bus 21, the SOPR 20, the selector 33, the ALU 31 and the ALU output line 34 and is transferred so that the portions thereof relating to the respective fields shown in FIG. 1 are loaded into the F 30, the BCNT 40, the FMSAR 50, the FBP 141, the SMSAR 51 and the SBP 241. In this operation, the data merely passes through the ALU 31.

For comparison purposes, an operation sequence in a prior art system is shown as follows.

| STEP 1: | Read 1st operand<br>(MS → MSRDR → FOPR) |
|---|---|
| STEP 2: | Read 2nd operand SMSAR+8 → SMSAR<br>(MS → MSRDR → SOPR) |
| STEP 3: | Select bytes by FBP, SBP |
| STEP 4: | 1-byte operation by ALU. Result → FOPR |
| STEP 5: | FBP+1 → FBP. SBP+1 → SBP |
| STEP 6: | If BCNT = 0 then go to step 15 |
| STEP 7: | BCNT−1 → BCNT |
| STEP 8: | If FBP ≠ 0 and SBP ≠ 0 then go to step 3 |

-continued

| STEP 9: | If FBP ≠ 0 and SBP = 0 then go to step 2 |
|---|---|
| STEP 10: | FOPR → MSWDR |
| STEP 11: | Write result to MS. FMSAR+8 → FMSAR<br>(MSWRD → MS) |
| STEP 12: | Read 1st operand (addressed by FMSAR)<br>(MS → MSRDR → FOPR) |
| STEP 13: | If SBP = 0 then read 2nd operand<br>(MS → MSRDR → SOPR)<br>SMSAR+8 → SMSAR |
| STEP 14: | Go to step 3. |
| STEP 15: | FOPR → MSWDR |
| STEP 16: | Write result to MS (addressed by FMSAR)<br>(MSWDR → MS) |
| STEP 17: | End of instruction |

In each step, if a conditional sentence (test) is not included, the process goes to the next step. If the condition is not met, the process also goes to the next step. The steps indicate logical operations and each step does not correspond to one cycle or one microstep of the processing unit.

The FMSAR 50 is updated when the writing of the result into the first operand position is specified, and the SMSAR 51 is updated when the reading of the second operand is specified. In both cases, the add operations are carried out in the AA 54.

An operation sequence of the present invention is exemplified by the following steps:

| STEP 1: | Read 1st operand. FMSAR+8 → FMSAR<br>(MS → MSRDR → FOPR) |
|---|---|
| STEP 2: | Read 2nd operand SMSAR+8 → SMSAR<br>(MS → MSRDR → SOPR) |
| STEP 3: | Select bytes by FBP and SBP |
| STEP 4: | 1-byte operation by ALU. Result → FOPR |
| STEP 5: | FBP+1 → FBP. SBP+1 → SBP |
| STEP 6: | If BCNT = 0 then go to step 15. |
| STEP 7: | BCNT−1 → BCNT |
| STEP 8: | If FBP ≠ 0 and SBP ≠ 0 then go to step 3. |
| STEP 9: | If FBP ≠ 0 and SBP = 0 then go to step 2. |
| STEP 10: | FOPR → MSWDR |
| STEP 11: | Read 1st operand. FMSAR−8 → FMSAR<br>(MS → MSRDR → FOPR) |
| STEP 12: | If SBP = 0 then read 2nd operand.<br>(MS → MSRDR → SOPR)<br>SMSAR+8 → SMSAR |
| STEP 13: | Write result to MS (addressed by FMSAR)<br>(MSWDR → MS)<br>FMSAR+16 → FMSAR |
| STEP 14: | Go to step 3. |
| STEP 15: | FOPR → MSWDR FMSAR−8 → FMSAR |
| STEP 16: | Write result to MS (addressed by FMSAR)<br>(MSWDR → MS) |
| STEP 17: | End of instruction |

In the steps 1, 2, 11, 12 and 15, the C 58 generates a constant of 8 and sets it to the AA 54 and in the step 13 the C 58 sets a constant of 16 to the AA 54. The AA 54 carries out add operations in the steps 1, 2, 12 and 13 and subtraction operations in the steps 11 and 15.

The features of the present invention are best represented by the step 1 and steps 10-15. Particularly, the MCC 200 checks the content of the BCNT 40 in the step 6 and checks the content of the FBP 141 in the steps 8 and 9. As a result, when the content of the BCNT 40 is greater than zero and the content of the FBP 141 is "000", the reading of the first operand stored in the next 8-byte block (depth) is carried out prior to the time consuming writing of the operation result. If the content of the SBP 241 is checked and found to be "000" in the step 12 and the necessity of the succeeding data is thus detected, the reading of the second operand is also carried out. Thereafter, the operation result is written.

The FMSAR 50 is updated when the reading of the first operand is specified or when the writing of the operation result to the first operand position is specified. In those cases, the add operation or the subtract operation is carried out in the AA 54. The SMSAR 51 is updated when the reading of the second operand is specified, as is done in the prior art system, and the add operation is carried out in the AA 54.

Figure 4:
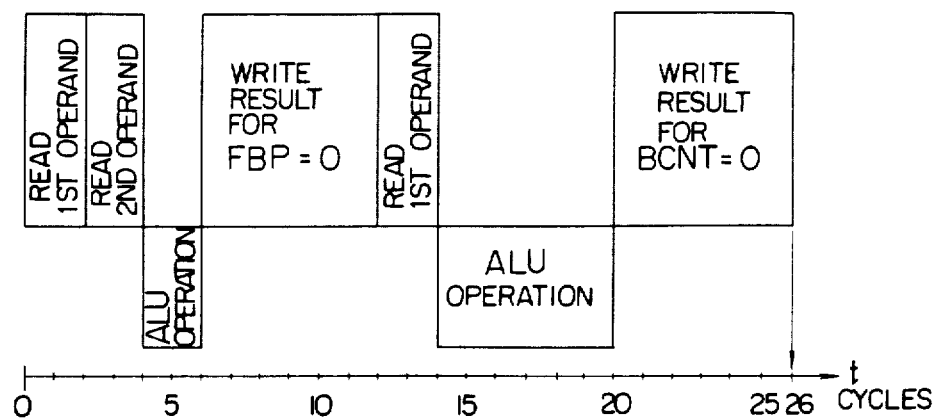
FIG. 4 shows a process time chart relating to the prior art system.
Figure 5:
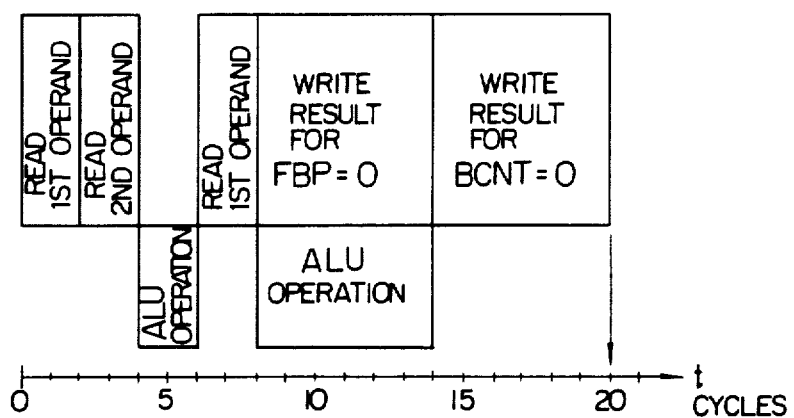
FIG. 5 shows a process time chart relating to the present invention.

Considering a specific example where the read operation of the MS 1 requires two cycles, the write operation of the MS 1 requires six cycles, the ALU 31 can process one byte per cycle, the L field of the instruction conains "7" (indicating the processing of eight bytes), the low order three bits of the ADR 1 field contain a binary number "110" and the low order three bits of the ADR 2 field contain a binary number "000", the prior art system and the present system are explained with reference to FIGS. 4 and 5.

For a comparison purpose, FIG. 4 shows a time chart for the processing in the prior art system. The reading of the first and second operands takes four cycles and after two cycles of ALU operation a binary number "000" is set in the FBP 141. The writing of the result for the FBP=0 takes six cycles, and the reading of the succeeding first operand takes two cycles, and after six cycles of ALU operation, zero is set to the BCNT 40. Finally, the writing of the result for BCNT=0 takes six cycles. Thus, a total of 26 cycles are required.

FIG. 5 shows a time chart for the processing of the present invention. The reading of the first and second operands takes four cycles, and the ALU operation takes two cycles. The writing of the result for FBP=0 is permitted at this point, but the reading of the succeeding first operand is first carried out in two cycles. At this time, the data necessary for the ALU operation are available at the FOPR 10 and the SOPR 20 and the ALU operation is resumed. The ALU operation takes six cycles. The writing of the result for FBP=0 is carried out in parallel with the ALU operation in six cycles. When the ALU operation ends, zero is set into the BCNT 40 and the writing of the result for BCNT=0 is carried out in six cycles. Thus, a total of 20 cycles are required. The present invention is also applicable in executing an instruction whose operand is stored in another storage or another register.

The main storage used in the present invention may be magnetic, electrostatic or optical memory, such as a semiconductor memory or a disc storage. The present invention is particularly effective when the write time is longer than the read time.

According to the present invention, the writing and the succeeding ALU operation can be parallelly carried out and the execution time of the instruction is reduced by six cycles to compare with the prior art system. Accordingly, the present invention is effective in rapidly executing the instruction.

What is claimed is:

1. An arithmetic operation system comprising:
    storage means for storing data in the form of operands;
    arithmetic logic means associated with said storage means for reading operands from said storage means and for performing an arithmetic operation on said operands read from said storage means in one or more executing cycles depending on the operand length in accordance with a single instruction designating the arithmetic operation;
    detecting means for detecting that an operation result write request for writing an operation result into said storage means for one part of an operand as produced by said arithmetic logic means is in conflict with an operand read request for reading from said storage means a succeeding part of an operand at a position of the storage means succeeding the position of the one part of the said operand forming said operation result during an execution cycle for the same instruction; and
    priority means responsive to the detection result from said detecting means for giving an operand read request priority over an operation result write request, whereby an arithmetic and logic operation for the succeeding operand part and the writing of the operation result into said storage means can be overlapped in time.

2. A system according to claim 1 wherein said storage means has a shorter read time than a write time.

3. The system according to claim 1 wherein said write operation, said operation result is written at a position of said part of the operand in said storage means which has been read for the arithmetic and logic operation which produced said operation result.

4. A system according to claim 1 wherein said arithmetic operation is carried out by an arithmetic logic means having a shorter width than the operand length of said operand.

5. An arithmetic operation system comprising
    (a) a main storage for storing data including first and second operands of variable lengths, each having an operand address and an operand length specified by an instruction;
    (b) an arithmetic logic unit having a predetermined processing byte depth for carrying out arithmetic and logic operations on said first and second operands read from the storage at times depending upon the operand length in accordance with an instruction specifying the operation;
    (c) operand length update means for storing the operand length of the first and second operands indicated by the instruction and for updating the operand length each time an arithmetic and logic operation has been carried out by said arithmetic logic unit;
    (d) operand address update means for updating the operand address of each operand;
    (e) read register means for holding and supplying the first and second operands from said storage to said arithmetic logic unit, respectively, in a predetermined read/write byte depth for each operand,
    (f) write register means for writing the operation result of said arithmetic logic unit into said main storage at its first operand position of the predetermined byte depth;
    (g) first and second operand address means each for designating an address of said storge to be accessed; and
    (h) control means having means responsive to the output of said operand length update means and said operand address update means for giving an operand read request priority over an operation result write request and for controlling read and write operations of the main storage together with said address means such that, when the first read access cycle of the predetermined byte depth of the respective operand is completed, said first and second address means each update the operand address of said storage to indicate a subsequent read access position, when the subsequent read access cycle of said predetermined byte depth of said first operand based on said read request is completed, the first operand address means updates the operand address of the storage to prepare a write access cycle with said write request and updates the address for the succeeding read operation upon completion of said write access cycle, whereby a write operation of the operation result for the operand read in a read access cycle can be overlapped with an arithmetic and logic operation for the operand read in the subsequent read access cycle.

6. The system according to claim 5, wherein said operand address update means includes a first-operand byte pointer and a second-operand byte pointer each for specifying the byte position for said read register means each time an arithmetic and logic operation has been performed, said operand length update means includes an unprocessed byte counter for indicating an unprocessed byte number of the operand by decrementing the content of the counter upon completion of each given-byte-processing, and said control means detects the presence of a write request when said unprocessed byte counter indicates zero or said first operand byte pointer indicates a predetermined byte position, and detects the presence of a read request when said first-operand byte pointer for said second-operand byte pointer indicates the predetermined byte position.

7. The system according to claim 5, wherein the processing byte width of said arithmetic logic unit is smaller than said predetermined byte depth of each operand.

8. The system according to claim 6, wherein each of said first and second addresses means updates the operand address on the storage upon completion of its initial read cycle by adding to the current address a positive value equal to the predetermined read/write byte depth, the first operand address means updates the operand address on the storage upon completion of a read cycle subsequent to the initial read cycle by adding to the current address a negative value equal to the predetermined read/write byte depth so as to prepare a write cycle which allows an operation result by the ALU to the written into an address position of the predetermined byte depth of the operand having led to the operation result, and then said first operand address means updates the address for the succeeding read operation by adding a positive value equal to double the predetermined byte depth.

* * * * *